Sept. 13, 1927.

S. ANGELO

DIRECTION INDICATOR FOR AUTOMOBILES

Filed May 8, 1924

1,641,950

Inventor

S. Angelo

By C. A. Snow & Co.

Attorneys

Patented Sept. 13, 1927.

1,641,950

UNITED STATES PATENT OFFICE.

STEFANI ANGELO, OF STARKVILLE, COLORADO.

DIRECTION INDICATOR FOR AUTOMOBILES.

Application filed May 8, 1924. Serial No. 711,853.

This invention relates to signal or direction indicating mechanism for use on automobiles.

The object of the invention is to provide a simple and efficient device operated at the dash by the driver for notifying approaching cars or pedestrians or crossing officers of the intention of the driver as to the course he intends to take.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1:
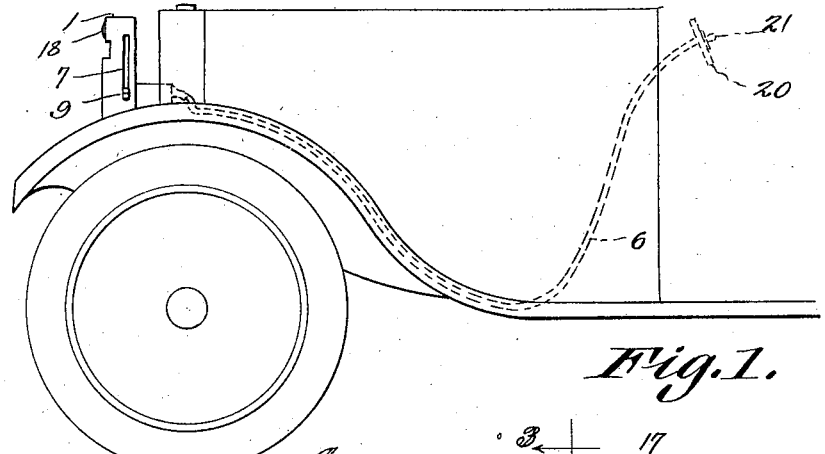
Figure 1 represents a side elevation of the front portion of an automobile equipped with this invention.

In the embodiment illustrated a casing 1 is shown composed of any suitable material having a partition 2 dividing the casing into two compartments 3 and 4 the outer wall of compartment 4 terminating short of the top of the casing for a purpose presently to be described.

The shafts 5 and 10 extend transversely through the lower portion of compartment 3 one of said shafts being located above the other, the lowermost shaft 10 extending through the partition 2 into compartment 4 and having fixed to the projecting end thereof an indicating pointer or finger 11 preferably provided with an arrow head and intended for a purpose presently to be described. An arm 12 extends laterally from shaft 10 in a plane at right angles to finger 11 as is shown clearly in Fig. 4 and is designed to close a switch 15 located in the path of said arm when the finger 11 is swung at an upright position shown in dotted lines in Fig. 4.

Figures 2, 3, 4:
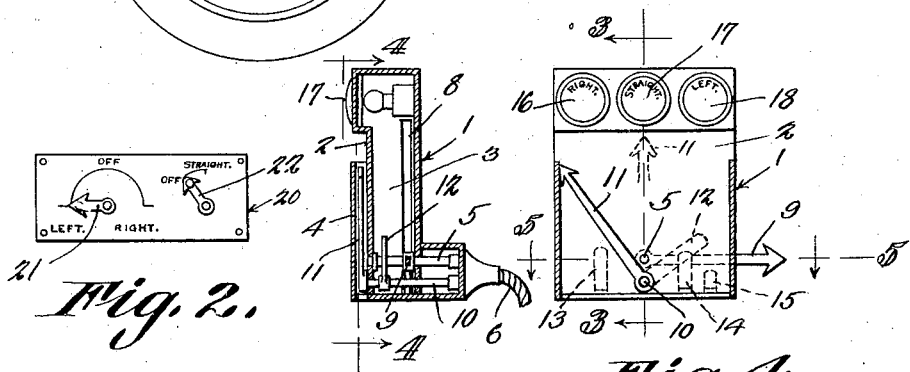
Fig. 2 is a face view of the control board used in connection with the invention.
Fig. 3 is a vertical section taken on the line 3—3 of Fig. 4.
Fig. 4 is a vertical section taken on the line 4—4 of Fig. 3.
Figures 5, 6:
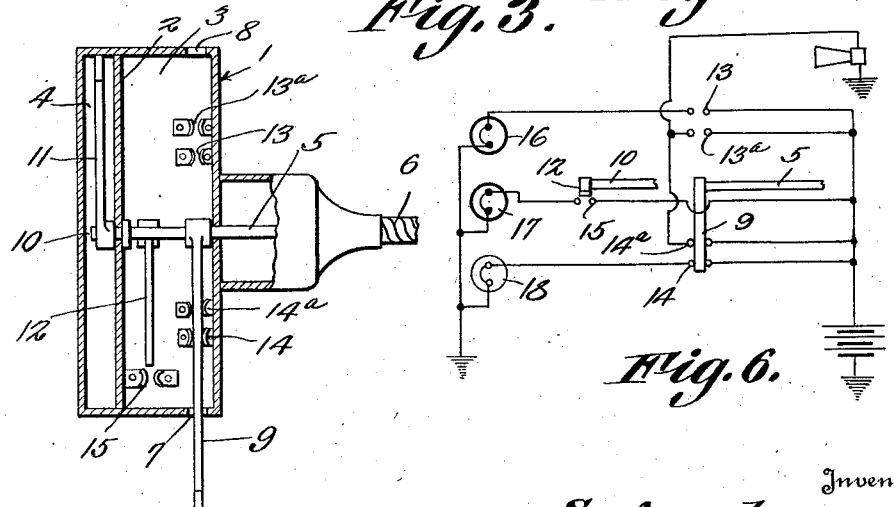
Fig. 5 is a horizontal section taken on the line 5—5 of Fig. 4.
Fig. 6 is a diagram of the electrical circuit employed showing the location of the various parts of the invention in relation thereto.

An indicating finger 9 is fixed to the shaft 5 in the compartment 2 and is designed to swing through slots 7 and 8 in the opposed end walls of the casing. This finger 9 is also equipped with an arrow head and when swung in one direction indicates that the driver is going to turn to the left as shown in Figs. 4 and 5 and when swung in the opposite direction projects through slot 8 at the right of the casing and indicates that the car is going to turn to the right.

Switches 13 and 14, and 13$^a$ and 14$^a$ are located on opposite sides of shaft 5 in compartment 2 in the path of the finger 9 so that when the said finger is swung in one direction or the other it will close the corresponding switch and light a light at the rear of the glass disks 16 or 18 on which are respectively words "Right" "Left", and simultaneously sound the horn with which switches 13$^a$ and 14$^a$ are connected. Disk 17 located between disks 16 and 18 bears the word "Straight" and the light behind it is lit by the turning of finger 11. These disks 16, 17 and 18 are preferably made of colored glass usually green and face the front of the car being intended to attract the attention particularly of crossing officers.

A flexible shaft 6 is connected with shafts 5 and 10 and at its opposite end with pointers 21 and 22 mounted on a control board 20 designed to be located in convenient position for actuation by the driver preferably on the instrument board of the car. The board 20 has the words "Left and Right" located at the opposite ends of the path of the pointer 21, with the word "Off" located intermediate said ends so that when the pointer is swung to its extreme position to the left it will correspondingly turn shaft 5 to swing the indicating finger 9 toward the left causing it to project through slot 7 and to close switch 14. This turning of the finger 9 will light the electric bulb at the rear of disk 18 so that the word "Left" will stand out prominently and attract attention and in connection with the pointer 9 clearly show that the car is to turn toward the left. Simultaneously with the swinging of finger 9 into the position above described the horn switch will be closed and the horn sounded thus providing additional warning. When the car is to turn toward the "Right" the driver swings the pointer 21 to its extreme limit toward the right thus causing the finger 9 to swing out through slot 8 and to simultaneously close switch 13 whereby the bulb at the rear of disk 16 is lighted causing the word "Right" to be clearly seen and to shown that the car is going to turn toward the right.

When the car is going straight ahead the pointer 21 is swung to the position whereby the word "Off" appears and when so swung retracts the pointer 9 housing it within the casing. The pointer 22 is then swung to the point marked "Straight" on the board 20 which will cause the shaft 10 to be rotated a sufficient distance to swing the pointer 11 into the dotted line position shown in Fig. 4 which causes the arrow head on said pointer to extend above the front wall of compartment 4 and at the same time causes arm 12 to close switch 15 and light the bulb at the rear of disk 17 on which appears the word "Straight" thus calling attention to the fact that the car is going straight ahead.

The pointer 22 is swung into the position shown in Fig. 2 opposite the word "Off" when the other indicating finger 9 is to be actuated.

The casing 1 in which the parts above are mounted is very compact occupying a minimum amount of space adapting it to be mounted on the front fender of the car preferably on the left fender so that it will be in position to be conveniently seen by a crossing officer as well as by approaching vehicles.

I claim:—

In a signaling device, a casing, said casing embodying a rear wall and spaced front walls, the spaced front walls defining a front and a rear compartment, one of the front walls terminating in spaced relation with the upper portion of the casing defining an indicator space, said casing having lateral elongated openings, horizontal shafts arranged one above the other and extending into the casing, an indicating finger mounted on one of the shafts and operating in the front compartment, an indicating finger on the opposite shaft and operating in the rear compartment, the first mentioned finger having its upper end operating above one of the spaced front walls, the finger in the rear compartment operating through the lateral elongated openings, and means for operating the shafts.

In testimony that I claim the foregoing as my own, I have hereto affixed my signature.

STEFANI ANGELO.